Dec. 19, 1944.  J. BAILEY  2,365,326
METHOD OF AND APPARATUS FOR PRODUCING CONTINUOUS ORGANIC
PLASTIC SHEETS OR RIBBONS BY EXTRUSION
Filed Nov. 28, 1942  3 Sheets-Sheet 1
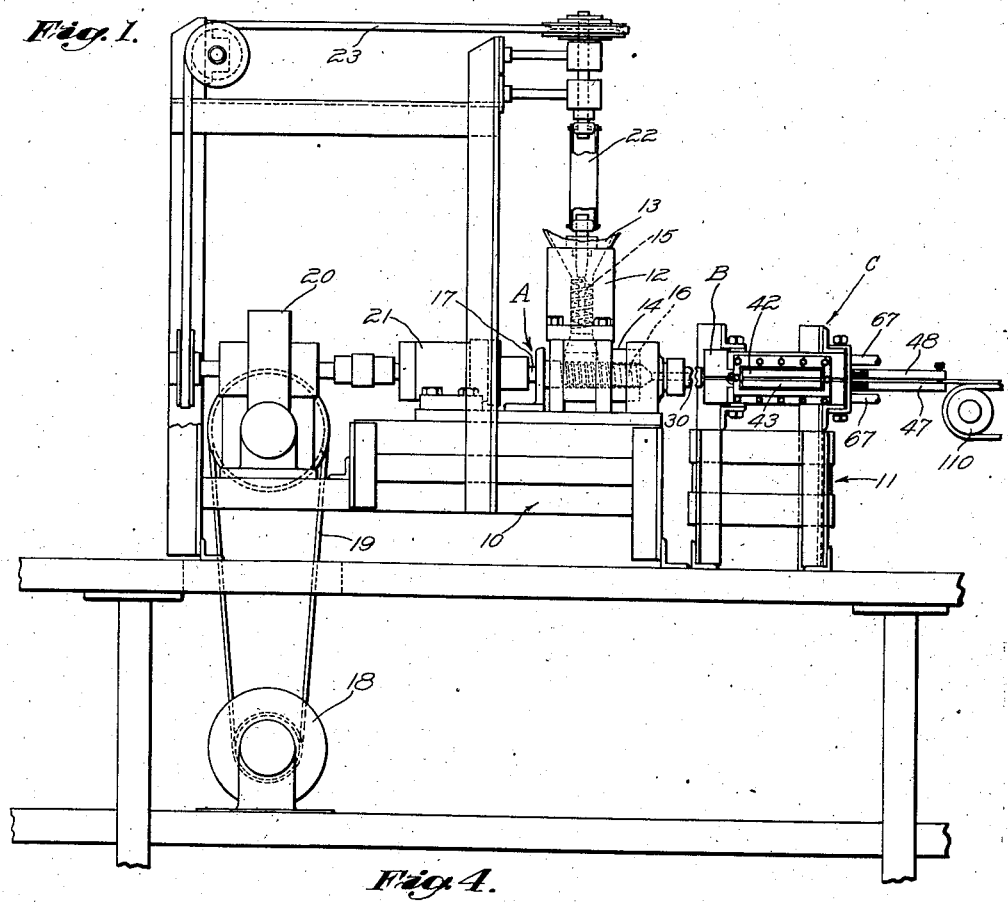
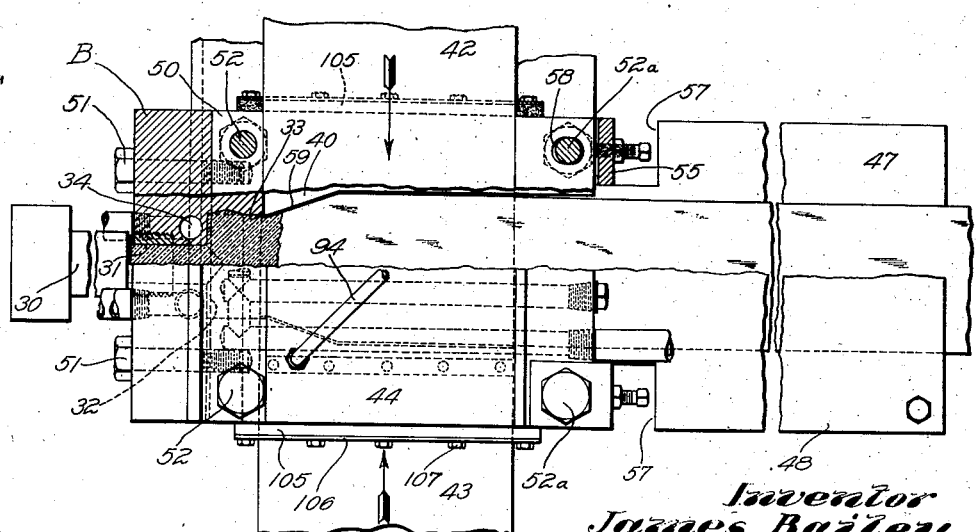

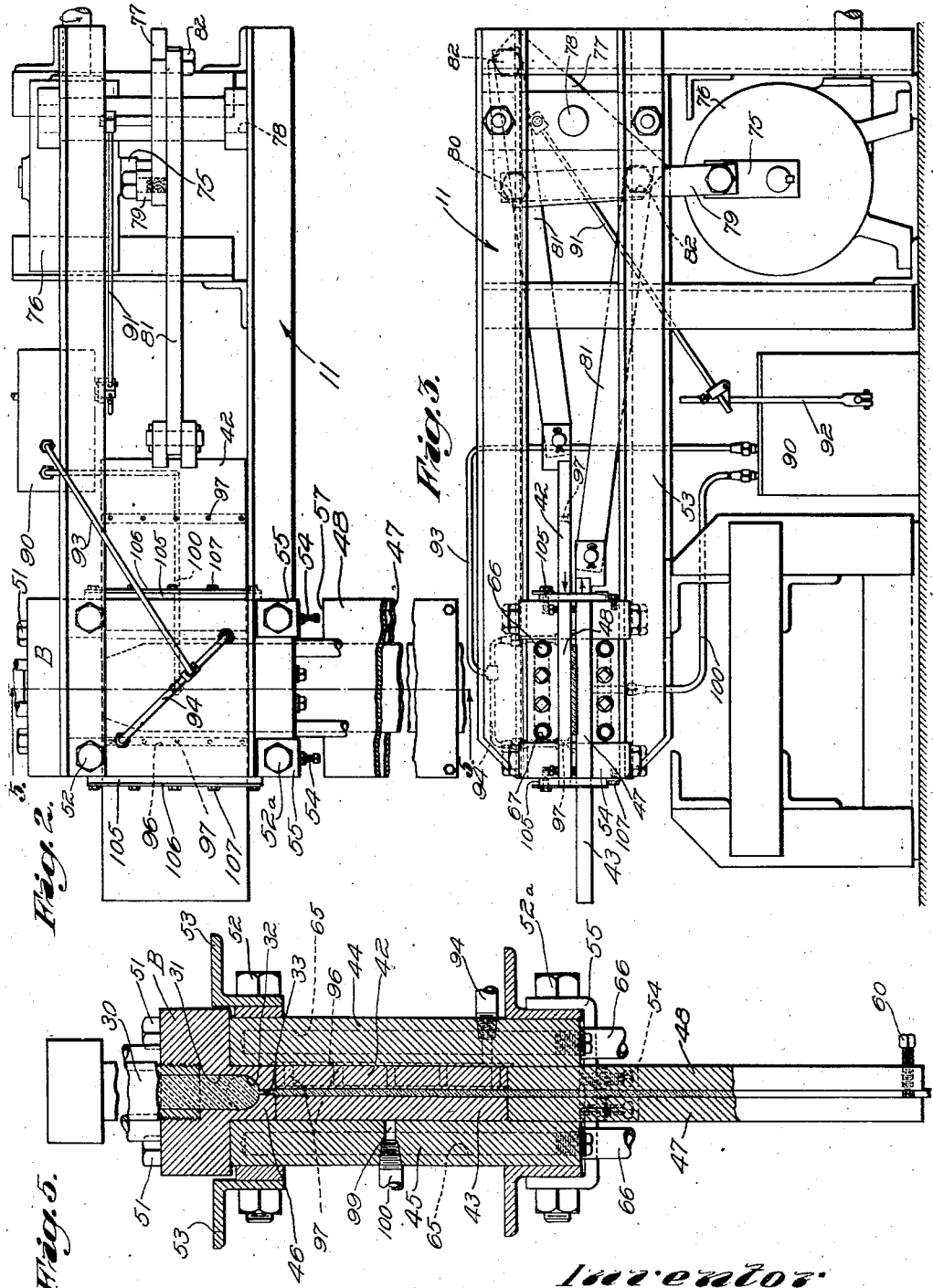

Patented Dec. 19, 1944

2,365,326

UNITED STATES PATENT OFFICE 2,365,326

METHOD OF AND APPARATUS FOR PRODUCING CONTINUOUS ORGANIC PLASTIC SHEETS OR RIBBONS BY EXTRUSION

James Bailey, West Hartford, Conn., assignor to Plax Corporation, Hartford, Conn., a corporation of Delaware Application November 28, 1942, Serial No. 467,222

25 Claims. (Cl. 18—12)

This invention relates to the production of continuous organic plastic sheets or ribbons of substantial thickness, for example, the thickness required for aeroplane windshields, and the object is to provide a novel and advantageous process and improved apparatus for that purpose which are efficient and practical.

I have found that various problems and difficulties are presented in forming relatively thick sheets or ribbons of organic plastics by extruding the plastic through dies, the walls of which are fixed or immovable. If such dies are of sufficient length to permit the plastic to harden sufficiently to hold its shape and to permit the plastic to cool (in case of plastics which harden upon cooling) at such a rate that gas and vacuum bubbles are prevented, difficulties, due to the tackiness of the plastic and its tendency to stick to the die walls, are experienced in forcing the plastic through the die. Because of the considerable pressure required to force the plastic through a relatively long, rigid die, the plastic is apt to be badly stressed, resulting in objectionable strains, and difficulty is experienced in attaining and retaining the desired shape and dimensions. On the other hand, with a relatively short, rigid die, the plastic while in the die will not harden sufficiently to hold its shape; gas bubbles and vacuum bubbles show up in the extruded relatively thick sheet because it has not had sufficient time to cool at the desired rate; the surfaces of the sheet are rough and blemished, and difficulty is experienced in holding the sheet to close dimensions.

The aim of the present invention is to provide an improved method of forming organic plastic ribbons of substantial thickness by extruding the plastic through a die and wherein the above and other difficulties are either overcome or eliminated to a large extent.

More particularly, an aim of the invention is to provide an improved method by means of which relatively thick ribbons of plastic material may be formed by extruding the molding material or compound through a die at a relatively high rate of production and a sheet of high quality is obtained in that the sheet is of generally uniform gauge and width, is substantially free of excessive strains and stresses, is substantially devoid of gas and vacuum bubbles, and has smooth and polished surfaces.

A further aim of the invention is to provide an improved machine for effectively carrying out my improved method.

Other objects will be in part obvious and in part pointed out more in detail hereinafter.

The invention accordingly consists in the features of construction, combination of elements and arrangements of parts which will be exemplified in the construction hereinafter set forth and the scope of the application of which will be indicated in the appended claims.

For a more complete understanding of the novel process and the apparatus of the invention, reference may be had to the following specification and the accompanying drawings disclosing one embodiment of the apparatus which is adapted to the performance of the process of the invention. In said drawings:

Figure 1 is a side elevational view of the apparatus;

Fig. 2 is a top plan of the die portion of the apparatus and the framework carrying the same;

Fig. 3 is a front view of the arrangement shown in Fig. 2;

Fig. 4 is a detail top plan of the nozzle and die with the continuous sheet shown partly in elevation and partly in section, portions of the nozzle and the die structure being broken away in the interest of clarity;

Fig. 5 is a sectional view taken longitudinally and vertically through the center of the nozzle and die structure, this view being taken substantially on line 5—5 of Fig. 2;

Figure 6:
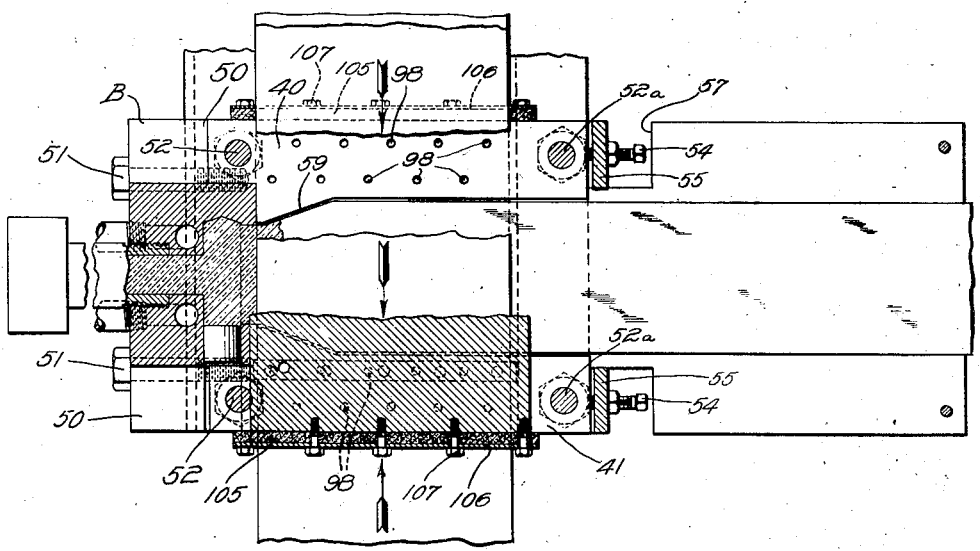
Fig. 6 is a horizontal cross sectional view through the die structure, this view being taken substantially on the line 6—6 of Fig. 7.
Figure 7:
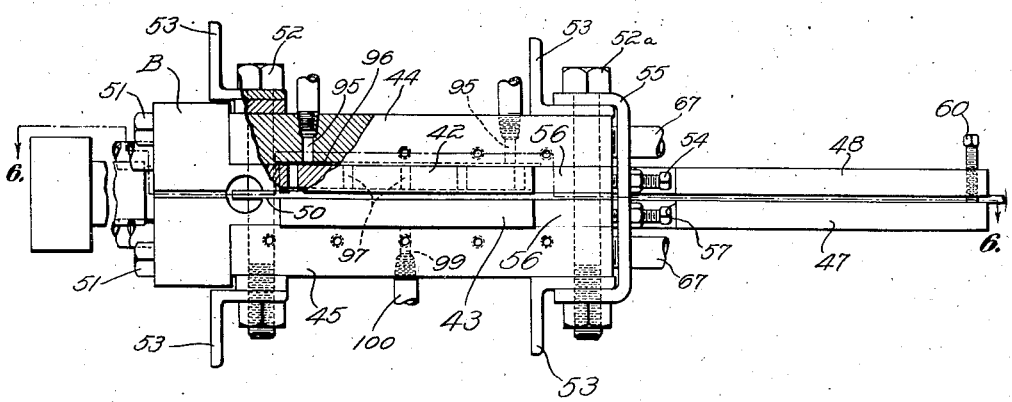
Fig. 7 is a side view of the die structure with portions broken away.

Referring to the drawings in detail, the apparatus comprises generally a stuffer A for compressing and working the molding material and softening it and then delivering it to the nozzle B which, in turn, delivers it to the die structure C. The stuffer A is supported by a framework 10, and the die structure by a framework 11, these two frameworks being at right angles to one another. The stuffer may be of any suitable construction, it here being shown for illustrative purposes as comprising a vertically disposed cylinder 12 having a hopper 13 at its upper end, and a horizontally disposed cylinder 14 to which the cylinder 12 delivers. Located in the respective cylinders 12 and 14 are feed screws 15 and 16. The cylinder 14 may be provided with the usual water jacket or other means (not shown) for heating the same so as to assist in softening the molding material and maintaining it within the desired working range of viscosity. The screw 16 is carried by a shaft 17 which may be driven in any suitable manner as by means of a motor 18 acting through a belt 19, a reduction gearing 20, and a coupling 21. The screw 15 is carried by a shaft 22 which may be driven through the reduction gearing 20 and a belt 23.

The discharge end of the cylinder 14 is provided with a discharge nipple or pipe 30 which is threaded into the nozzle B, as most clearly shown in Figs. 4 and 5. The nozzle has a longitudinal bore 31 which terminates in a transverse bore 32 from which leads a transverse slot 33. The transverse dimension of this slot is preferably less than the desired width of the finished sheet or ribbon being formed. Also, preferably, but not necessarily, the slot is of less thickness or vertical height than the desired gauge or thickness of the finished sheet. The block or nozzle member B may have a fluid passage 34 (see Fig. 4) through which water or other fluid of the desired temperature may be circulated so as to maintain the plastic at the desired temperature and state of viscosity.

Referring now to the die structure, the same comprises, generally, a pair of deckle or edge plates 40 and 41 which determine the width of the ribbon being produced and top and bottom plates 42 and 43 vertically spaced apart in accordance with the desired gauge or thickness of the ribbon being produced. In accordance with the present invention, and in order to accomplish the heretofore recited and other objects thereof, the plates 42 and 43 are simultaneously reciprocated in opposite directions transversely of the direction of movement of the sheet being formed. By reciprocating these plates, friction between the plates and the faces of the sheet being formed is materially reduced and undue sticking of the plastic to the plates is avoided, as will be explained later more in detail. The plates 40, 41, 42, and 43 are supported by a frame which comprises top and bottom blocks 44 and 45 which are spaced apart at their rear ends by a transverse rectangular rib 46 provided on the forward face of the nozzle or block B. The blocks 44 and 45 are spaced apart at their forward ends by the interposed rear ends of extension plates 47 and 48 and between which plates 47 and 48 the forward ends of the deckle plates 40 and 41 are interposed. The block B at its opposite sides is slotted as at 50 so as to receive the rear ends of the deckle plates. The nozzle or block B is secured to the frame blocks 44 and 45 by screws 51. The various parts of the frame are secured together by bolts 52 and 52a which are also employed to secure the assembly to the angle bars 53 which form part of the framework 11. The bolts 52 extend through aligned openings provided in the horizontal webs of the bars 53, the blocks 44 and 45, the rib 46, and the rear ends of the deckle plates 40 and 41. The bolts 52a extend through aligned openings in the webs of the other pair of angle bars, the blocks 44 and 45, the rear ends of the extension plates 47 and 48, and the forward ends of the deckle plates 40 and 41. It will be clear from the drawings that the upper die plate 42 slides on the top surfaces of the deckle plates and is held down against those plates by the top block 44. The lower die plate 43 is supported by the lower block 45 and is held thereby against the under surfaces of the deckle plates. The rear edges (the left hand edges as viewed from Fig. 5) of the die plates have sliding engagement with the front face of the rib 46, and the forward edges of the die plates have sliding engagement with the rear edges of the plates 47 and 48. Thus, the die plates are held against movement other than a sliding movement in their own planes transversely of the direction of movement of the sheet being produced. The extension plates 47 and 48 are adapted to be adjusted with respect to the block B by screws 54 carried by U-shaped brackets 55 secured in place by the bolts 52a. It will be observed, particularly from Fig. 4, that the extension plates 47 and 48, adjacent their rear ends, have laterally extending lugs 56 with notches 57 therebehind. The lugs are interposed between the forward ends of the edge plates and the respective blocks 44 and 45, and the notches 57 accommodate the brackets 55 and the screws 54. These screws bear against the front edges of the lugs. The openings 58 in the lugs, and through which the bolts 52a extend, are elongated to permit such adjustment of the extension plates.

By preference, the deckle plates 40 and 41 of the die structure are somewhat thicker than the thickness or vertical height of the nozzle opening or slot 33 so that, as shown in Fig. 5, the opposing faces of the sliding die plates 42 and 43 form a die space which is thicker than the nozzle opening or slot. Also, as will be observed from Figs. 4 and 5, the opposing side edges of the deckle plates are tapered at their rear edges, as at 59, outwardly and forwardly and then, for the remainder of their lengths, are parallel. These inclined portions lead from the ends of the nozzle slot 33. Thus, as the viscous plastic is forced from the nozzle opening, it may spread out vertically and laterally. The plate 47 serves to cool and support the formed ribbon and prevent it from sagging after the ribbon has been formed between the die plates 42 and 43, and the plate 48 overlies the formed ribbon and serves to cool it and protect it against drafts and air currents which otherwise may adversely affect the ribbon which is still in the state of cooling. These plates 47 and 48 are spaced apart at substantially the same distance as the die plates but, if desired, the upper plate may be slightly inclined upwardly and forwardly with respect to the lower plate. The extension plates are maintained suitably spaced apart at their forward ends by screws 60.

It is understood that, as the plastic material is extruded through the nozzle into the space between the reciprocating die plates, it is of relatively high temperature, and it is desirable to gradually cool the ribbon being formed between the die plates while, at the same time, maintaining a temperature sufficiently high to prevent the formation of vacuum bubbles in the sheet. To these ends, the blocks 44 and 45 are suitably cored to provide passages 65 so that a cooling fluid, such as oil, may be circulated through the blocks. The passageway in each block has an inlet opening 66 and an outlet opening 67.

The die plates 42 and 43 may be reciprocated simultaneously in opposite directions transversely of the sheet being formed through any suitable mechanism, that shown in Figs. 2 and 3 of the drawings being by way of example only. It comprises a crank 75 which may be rotated through a driving member 76. Between this crank and a triangular lever 77 pivoted to the supporting framework 11, as at 78, is a pitman or connecting link 79. The upper end of this pitman is pivotally connected to the lever at 80. The die plates 42 and 43 are respectively connected to this lever by links 81. These links are pivotally connected, as at 82, to the lever to opposite sides of the pivotal point 78 thereof so that, while one plate and its connected link 81 are moving in one direction, the other plate and its connected link are moving in the opposite direction.

As previously stated, the die plates 42 and 43 are reciprocated transversely of the strip being formed in order to reduce the friction therebetween and to prevent undue sticking of the plastic to the surfaces of the plates. To further reduce the friction between the die plates and the sheet being formed, and to further insure that the plastic will not unduly adhere to the surfaces of those plates, means are provided for supplying a film of anti-sticky substance or lubricant to those surfaces of the plates which slide over the faces of the sheet. This lubricant may be of any suitable character so long as it is substantially inert to the plastic. If desired, a mineral oil, such as is used in differential gear boxes, may be employed. In the present illustrative disclosure, I have shown a tank 90 from which lubricant may be supplied to the die structure and back to which tank the lubricant drains. Provided within the tank is a pump (not shown) which may be operated from the lever 77 through a link 91 and an oscillating arm 92. Leading upwardly from the tank to a point above the die structure is a delivery pipe 93, the discharge end of which is connected to a branch pipe 94. The opposite ends of this branch pipe lead to the vertical openings 95 in the top block 44. These openings are disposed above the respective deckle plates 40 and 41. On the under side of the block 44 are two longitudinally extending grooves 96 to which the openings 95 respectively deliver. Provided in the upper die plate 42 are two series of vertical holes 97 adapted to respectively register with the grooves 96 in the top block on the respective extreme positions of the upper die plate 42. In Fig. 3, the plate 42 is shown in the extreme right hand position, and in this position the left hand series of holes 97 register, as shown, with the left hand groove 96. When the plate 42 is moved to its extreme left hand position, the right hand series of holes 97 will register with the right hand groove 96. The deckle plates 40 and 41 are provided with a plurality of apertures 98 (see Fig. 6) through which the lubricant may drain from the upper surfaces of such plates onto the upper surface of the lower reciprocating die plate 43. Leading from a drain opening 99 located in the central portion of the bottom block 45 is a drain pipe 100 which delivers back to the supply tank 90. With this arrangement, it will be seen that the lubricant is delivered from the supply tank through the pipes 93 and 94 and the openings 95 to the channels 96 on the under side of the top block 44. The lubricant will spread throughout the length of these channels, and when a series of openings 97 in the upper die plate 42 is brought into alignment with its respective channel, the lubricant will drain through this series of openings onto the top of the deckle plate therebeneath. Then, as the upper die plate is reciprocated, its lower surface will pick up the lubricant deposited on the top surfaces of the deckle plates with the result that that portion of the upper die plate 42 which slides over the top surface of the sheet is always maintained with a film of lubricant thereon. Some of the oil will drain through the apertures 98 in the deckle plates onto the upper surface of the lower die plate 43, and this lubricant will, due to the reciprocation of the latter plate, form a film thereon which will prevent direct contact between the top surface of that plate and the bottom surface of the sheet. The excess oil will drain about the edges of the bottom plate to the under side thereof and will then flow through the hole 99 and the return pipe 100 to the tank 90. In order to prevent the lubricant from being carried by the reciprocating die plates beyond the lateral edges of the top and bottom blocks, packings 105 are provided at each side of the blocks and about the openings through which the plates slide. These packings are backed up by thin metal frames 106 and are secured in place by screws 107.

It will be seen from the foregoing description, taken in connection with the accompanying drawings, that the material from which the sheet is formed is forced by the stuffer under considerable pressure through the nozzle B into the die space defined by the deckle plates 40 and 41 and the top and bottom reciprocating plates 42 and 43. The plastic which, of course, is in a heated condition and in a viscous state will, as it issues from the nozzle into the die space, spread laterally and build up vertically, this being permitted because of the tapered portions 59 of the deckle plates and the fact that the reciprocating die plates are spaced apart a distance greater than the thickness of the nozzle slot. This is of advantage in that the plastic, as it enters the die space and at which point it is relatively hot, is somewhat free to accommodate itself to the cross sectional dimensions of the die space so that the tendency of the inner portion of the stream of plastic issuing into the die space to flow longitudinally through the exterior chilled portion of the sheet being formed is reduced, with the result that shearing strains and stresses in the finished sheet are correspondingly reduced or eliminated. As the sheet is being formed within the die, the die plates 42 and 43 are reciprocated in opposite directions transversely of the direction of travel of the sheet so as to materially reduce the friction between those plates and the upper and lower faces of the sheet, and this friction is further reduced by the maintenance of films of lubricant on the bottom face of the upper plate and the upper face of the bottom plate in the manner previously described. As the plates are reciprocated, they tend to roll the plastic therebetween with the result that the edges of the sheet are prevented from sticking to the opposing edges of the edge plates. Due to the fact that friction is reduced between the die plates and the sheet being formed, objectional sticking of the plastic to the elements which form the die space is prevented and jamming of the plastic is avoided and, therefore, the die may be made sufficiently long in the direction of travel of the sheet to permit the plastic to harden sufficiently to hold its shape and to be substantially self-supporting, and to permit it to cool at such a rate and under such pressure that gas and vacuum bubbles are prevented. In the present illustrative disclosure, the die opening is greater in length than the width of the sheet being formed. Also, by reciprocating the die plates, the surfaces of the sheet being formed are rendered smooth and polished. The rate of transverse travel of the movable plates 42 and 43 of the die bears no fixed relation to the longitudinal travel of the sheet and, hence, the oil film between the plates and the sheet will be maintained even though the plastic stops moving, and thus jams are prevented. The formed sheet will pass from the die space onto the lower extension plate 47, and while on this plate, it is protected by the upper extension plate. The finished sheet may pass from the extension plates onto a suitable carrier such as an endless belt, a portion of which is indicated at 110 of Fig. 1.

It is, of course, understood that various kinds of organic plastic compounds, either of the thermoplastic or thermo-setting type, may be formed into sheets or ribbons in accordance with the present invention. The invention, however, while not limited thereto, finds particular application in connection with dry process extrusion, that is, extrusion of a plastic compound which is free of solvents of the volatile type, such as acetone.

It is further understood that various changes may be made in the construction of the apparatus and in the mode of performing the method of the invention without departing from the scope of the appended claims.

I claim as my invention:

1. The process of forming flat continuous sheets of organic plastic material by extrusion which comprises forcing the plastic material under pressure through a die opening corresponding in cross section to the flat sheets to be formed and of a length which will permit the plastic to harden and become substantially self-supporting while passing therethrough, and reciprocating the walls of the die opening which define the opposite surfaces of the sheet simultaneously in opposite directions transversely to the direction of travel of the sheet.

2. The process of forming flat continuous sheets of organic plastic material by extrusion which comprises delivering under pressure a constant stream of plastic material in a heated and sticky condition to a die having a die opening corresponding to the flat sheets to be formed, forcing the plastic material under pressure of the incoming stream through the die, cooling the plastic material within the die so that the sheet, as it issues from the die, is in substantially hardened condition, and simultaneously reciprocating in opposite directions the walls of the die which define the major faces of the sheet at an angle to the direction of travel of the sheet.

3. The process of forming flat continuous sheets of organic plastic material by extrusion which comprises forcing the plastic material under pressure through a die having flat walls spaced apart substantially in accordance with the desired thickness of the sheet being formed, reciprocating said walls simultaneously in opposite directions transversely of the direction of travel of the sheet being formed, and maintaining a film of lubricant between the walls of the die and the surfaces of the sheet.

4. The process of forming flat continuous sheets of organic plastic material by extrusion which comprises heating the plastic material to a viscous and sticky state, delivering the heated and stick material to a die having spaced flat walls which define the faces of the sheet, forcing the material through the die while reciprocating the flat die walls thereof simultaneously in opposite directions transversely of the direction of travel of the sheet, and maintaining a film of lubricant between the material and the walls of the die.

5. The process of forming flat continuous sheets of organic plastic material by extrusion which comprises heating the plastic to a viscous and sticky state, delivering under pressure a constant stream of the heated and sticky material to a die having opposed flat walls which define the faces of the sheet, forcing the material under the pressure of the incoming stream through the die, cooling the material within the die so that the sheet as it issues from the die will substantially retain its shape, simultaneously reciprocating the walls of the die in opposite directions at an angle to the direction of travel of the sheet, and maintaining a film of lubricant between the material and the die walls.

6. The process of forming flat continuous sheets of organic plastic material by extrusion which comprises delivering the plastic material under pressure and in a sticky and viscous condition to a die having opposed flat walls which define the major faces of the sheet, causing the plastic material at the receiving end of the die to spread out in the direction of the width of the sheet being formed, forcing the material under pressure through the die in a continuous stream, and reciprocating the walls of the die simultaneously in opposite directions at an angle to the direction of travel of the sheet.

7. The process of forming continuous sheets of organic plastic material by extrusion which comprises delivering under pressure the plastic material in a sticky and viscous condition to a die having a die opening, causing the material within the receiving end of the die opening to spread out in the directions of the width and the thickness of the sheet being formed, forcing the material under pressure through the die in a continuous stream, and reciprocating the walls of the die which define the major faces of the sheet simultaneously in opposite directions at an angle to the direction of travel of the sheet.

8. The process of forming continuous sheets of organic plastic material by extrusion which comprises heating the plastic material to a viscous and sticky state, delivering under pressure a constant stream of the heated and sticky plastic material to a die having a die opening, causing the plastic material within the receiving end of the die opening to spread out laterally and vertically, forcing the plastic material under pressure of the incoming stream through the die, cooling the plastic material within the die so that the formed sheet as it issues therefrom will substantially retain its shape, and simultaneously reciprocating in opposite directions the walls of the die which define the major faces of the sheet at an angle to the direction of travel of the sheet.

9. The process of forming continuous sheets of organic plastic material by extrusion which comprises delivering the plastic material in a sticky and viscous state to a die opening of a die in a stream of lesser thickness and of lesser width than the sheet to be formed, causing the plastic material within the receiving end of the die opening to spread out laterally and vertically to the final desired width and thickness of the sheet being formed, forcing the plastic material under pressure through the die, and reciprocating the walls of the die which define the major faces of the sheet simultaneously in opposite directions at an angle to the direction of travel of the sheet.

10. The process of forming continuous sheets of organic plastic material by extrusion which comprises heating the plastic to a viscous and sticky state, delivering the heated and sticky plastic material under pressure to a die in a constant stream of lesser thickness and of lesser width than the sheet to be formed, causing the plastic material within the receiving end of the die to spread out laterally and vertically to the final desired width and thickness of the sheet being formed, forcing the material under pressure of the incoming stream through the die, cooling the material within the die so that the formed sheet as it issues from the die will substantially retain its shape, and simultaneously reciprocating in opposite directions the walls of the die which define the major faces of the sheet at an angle to the direction of travel of the sheet.

11. The process of forming continuous sheets of organic plastic material by extrusion which comprises delivering under pressure the plastic material in a sticky and viscous condition to a die opening, causing the plastic material within the receiving end of the die opening to spread out in the directions of the width and the thickness of the sheet being formed, forcing the plastic material under pressure through the die opening in a continuous stream, reciprocating the walls of the die opening which define the major faces of the sheet simultaneously in opposite directions at an angle to the direction of travel of the sheet, and maintaining a film of lubricant between the material and the walls of the die opening.

12. The process of forming continuous sheets of organic plastic material by extrusion which comprises heating the plastic to a viscous and sticky state, delivering the heated and sticky plastic material under pressure to a die in a constant stream of lesser thickness and of lesser width than the sheet to be formed, causing the material within the receiving end of the die to spread out laterally and vertically to the final desired width and thickness of the sheet being formed, forcing the material under pressure of the incoming stream through the die, cooling the material within the die so that the formed sheet as it issues from the die will substantially retain its shape, simultaneously reciprocating in opposite directions the walls of the die which define the major faces of the sheet at an angle to the direction of travel of the sheet, and maintaining a film of lubricant between the material and the die walls.

13. Apparatus for forming continuous sheets of organic plastic material which comprises a die having a relatively long die opening corresponding in cross section to the desired cross section of the sheet to be formed and having flat walls which define the major surfaces of the die opening mounted for reciprocating movement at an angle to the direction of movement of the material through the die opening, means for delivering a constant stream of the plastic material in a sticky condition to one end of said die opening and forcing the material through the die opening, and means for reciprocating said mentioned walls of the die opening simultaneously in opposite directions.

14. Apparatus for forming continuous sheets of organic plastic material which comprises a die having a die opening of a length which will permit the plastic material while passing therethrough to harden and become substantially self-supporting, said die having a pair of flat members spaced apart substantially in accordance with the thickness of the sheet to be formed and mounted for reciprocating movement transversely to the direction of movement of the material through the die opening, means for heating the plastic to a sticky state and delivering the same under pressure to the die opening and forcing the material through the die opening, means for cooling the material as it passes through the die opening, and means for simultaneously reciprocating said members in opposite directions.

15. Apparatus for forming continuous sheets of organic plastic material which comprises a die structure having a pair of deckle plates and a pair of reciprocating plates forming a die opening, said deckle plates having their opposed edges spaced apart and being of substantially the same thickness as the desired thickness of the sheet being formed, and said reciprocating plates being spaced apart by and having sliding engagement with said deckle plates, means for delivering a plastic material in sticky condition to the die opening and forcing the material under pressure through the die opening, and means for reciprocating said plates simultaneously in opposite directions transversely of the direction of movement of the sheet.

16. Apparatus for forming continuous sheets of organic plastic material which comprises a die opening having major walls spaced apart in accordance with the desired thickness of the sheet to be formed and having edge walls diverging one from the other in the direction of movement of the material for a portion of their lengths and then continuing in parallel relation to one another, said first mentioned walls being mounted for reciprocating movement at an angle to the direction of movement of the material through the die opening, means for delivering a constant stream of viscous material in a sticky condition to one end of the die opening and forcing the material through the die opening, and means for reciprocating the first mentioned walls of the die opening simultaneously in opposite directions.

17. Apparatus for forming continuous sheets of organic plastic material which comprises a die opening having major walls spaced apart in accordance with the desired thickness of the sheet to be formed and having edge walls diverging one from the other in the direction of movement of the material for a portion of their lengths and then continuing in parallel relation to one another, said first mentioned walls being mounted for reciprocating movement at an angle to the direction of movement of the material through the die opening, a nozzle at the inlet end of said die opening having a slot of lesser thickness than the die opening, means for delivering a constant stream of viscous plastic material in a sticky condition through said nozzle and forcing the material through the die opening, and means for reciprocating the first mentioned walls of the die opening simultaneously in opposite directions.

18. Apparatus for forming continuous sheets of organic plastic material which comprises a die structure having a pair of deckle plates and a pair of reciprocating plates forming a die opening, said deckle plates having their opposed edges spaced apart and being of substantially the same thickness as the desired thickness of the sheet being formed, and said reciprocating plates being spaced apart by and having sliding engagement with said deckle plates, a pair of extension plates at the discharge end of said die opening having their opposed surfaces respectively aligned with the opposed surfaces of said reciprocating plates, means for delivering a plastic material in sticky condition to the die opening and forcing the material under pressure through the die opening and between said extension plates, and means for reciprocating said reciprocating plates simultaneously in opposite directions transversely of the direction of movement of the sheet.

19. Apparatus for forming continuous sheets of organic plastic material which comprises a die having major walls and edge walls which form a relatively long die opening corresponding in cross section to the desired cross section of the sheet to be formed, means for supporting said major walls for reciprocating movement at an angle to the direction of movement of the material through the die opening, means for delivering a constant stream of the plastic material in a sticky condition to one end of said die opening and forcing the material through the die opening, means for reciprocating said major walls of the die opening simultaneously in opposite directions, and means for maintaining a film of lubricant between the material and the die walls.

20. Apparatus for forming continuous sheets of organic plastic material which comprises a die opening having major walls spaced apart in accordance with the desired thickness of the sheet to be formed and having edge walls diverging one from the other in the direction of movement of the material for a portion of their lengths and then continuing in parallel relation to one another, said first mentioned walls being mounted for reciprocating movement at an angle to the direction of movement of the material through the die opening, a nozzle at the inlet end of said die opening having a slot of lesser thickness than the die opening, means for delivering a constant stream of viscous material in a sticky condition through said nozzle and forcing the material through the die opening, means for reciprocating the first mentioned walls of the die opening simultaneously in opposite directions, and means for maintaining a film of lubricant between the material and the die walls.

21. Apparatus for forming continuous sheets of organic plastic material which comprises a die structure having a pair of deckle plates and a pair of reciprocating plates forming a die opening, said deckle plates having their opposed edges spaced apart and being of substantially the same thickness as the desired thickness of the sheet being formed, and said reciprocating plates being spaced apart by and having sliding engagement with said deckle plates, means for reciprocating said reciprocating plates simultaneously in opposite directions transversely of the direction of movement of the sheet, and means for supplying a lubricant to the interengaging faces of said deckle plates and reciprocating plates whereby to maintain a film of lubricant between the material and the walls of said plates which define the die opening.

22. The process of forming continuous sheets of organic plastic material by extrusion which comprises first forming the material into a flat ribbon by extruding it through a ribbon-forming orifice, and then forcing the ribbon through a sheet-forming die while reciprocating, transversely to the direction of travel of the plastic material, the walls which define the opposed faces of the die.

23. The process of forming flat continuous sheets of organic plastic material by extrusion which comprises forcing the plastic material under pressure through a ribbon-forming orifice, and then through a sheet-forming die opening to which said orifice directly delivers and of a length which will permit the plastic material to harden and become substantially self-supporting while passing therethrough and reciprocating the walls of the die opening which define the opposite surfaces of the sheet simultaneously in opposite directions transversely to the direction of travel of the sheet.

24. The process of forming continuous sheets of organic plastic material by extrusion which comprises first forming the material into a flat ribbon by extruding it through a ribbon-forming orifice, and then forcing the ribbon through a sheet-forming die while reciprocating, transversely to the direction of travel of the plastic material, the walls which define the opposed faces of the die, and maintaining a film of lubricant between the material of the sheet and the walls of the die.

25. Apparatus for forming flat continuous sheets of organic plastic material which comprises a nozzle having a flat ribbon-forming orifice, a die having a relatively long die opening to the inlet end of which said orifice directly delivers, said die opening corresponding in cross section to the desired cross section of the sheet to be formed and having flat walls which define the major surfaces of the die opening mounted for reciprocating movement at an angle to the direction of movement of the material through the die opening, means for delivering a constant stream of plastic material in a plastic condition to said orifice and forcing the material therethrough and through the die opening, and means for reciprocating said mentioned walls of the die opening simultaneously in opposite directions.

JAMES BAILEY.